(12) United States Patent
Lee et al.

(10) Patent No.: US 6,216,017 B1
(45) Date of Patent: Apr. 10, 2001

(54) SEPARABLE CELLULAR TELEPHONE AND METHOD FOR OPERATING THE SAME

(75) Inventors: Ki-Tae Lee, Taegu-Kwangyokshi; Masumoto Katsumi, Kyongsangbuk-do, both of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/132,789

(22) Filed: Aug. 13, 1998

(30) Foreign Application Priority Data

Nov. 6, 1997 (KR) .................................................. 97-58423

(51) Int. Cl.$^7$ ....................................................... H04B 7/00
(52) U.S. Cl. ............................ 455/567; 455/92; 455/575; 455/556
(58) Field of Search ............................... 455/89, 90, 128, 455/466, 550, 556, 557, 558, 566, 575, 567, 348, 349; 376/357, 433, 428

(56) References Cited

U.S. PATENT DOCUMENTS 5,493,703 * 2/1996 Yamashita .............................. 455/89
5,809,432 * 9/1998 Yamashita .............................. 455/575
5,924,044 * 7/1999 Vannatta et al. ...................... 455/556
5,960,367 * 9/1999 Kita ....................................... 455/567

\* cited by examiner

*Primary Examiner*—Thanh Cong Le
*Assistant Examiner*—Pablo Tran
(74) *Attorney, Agent, or Firm*—Dilworth & Barrese, LLP

(57) ABSTRACT

A cellular telephone which is separable into a main device and a remote device having a call service function, and a method for controlling communication between the two devices. The main device of the cellular telephone includes a first radio circuit for communicating with a cell site and a second radio circuit for communicating with the remote device. The remote can be separated from the main device and includes a radio circuit for communicating with the second radio circuit of the main device. In one aspect, a separable cellular telephone comprises: a main device having a first radio circuit for communicating with a cell site and a second radio circuit; and a remote device having a radio circuit for communicating with the second radio circuit of the main device, wherein upon receipt of an incoming call from the cell cite, the main device transmits call receipt information to the remote device and the remote device processes the incoming call.

19 Claims, 8 Drawing Sheets

SEPARABLE CELLULAR TELEPHONE AND METHOD FOR OPERATING THE SAME

BACKGROUND

1. Technical Field

The present application relates generally to a cellular telephone and, in particular, to a cellular telephone which can be separated into a main device and a remote device, and a method for controlling communication between the separated devices.

2. Description of the Related Art

A cellular telephone independently interchanges an RF (Radio Frequency) signal with a cell site (or base station) to provide a call service, as shown in FIG. 1. A conventional cellular telephone includes an RF transmitter and a signal processor, and performs data communication with the cell site to form a radio link to provide call service via the radio link. In general, a conventional cellular telephone is too large in size to be placed in a user's pocket. Consequently, a user will typically place the cellular telephone in a handbag, or simply hold it in hand. When the cellular telephone is placed in a handbag, however, the user must take it out of the handbag to either make or answer a call. Moreover, when the cellular telephone is in a silent (or vibration) mode, the user may not be aware of an incoming call. Furthermore, when the user holds the cellular telephone, it can easily be lost or damaged due to carelessness.

SUMMARY OF THE INVENTION

The present application is directed to a cellular telephone having a main device and a remote device having a call service function, and a method for controlling radio communication between the two devices. The main device of the cellular telephone includes a first radio circuit for communicating with a cell site and a second radio circuit for communicating with the remote device. The remote device includes a radio circuit for communicating with the second radio circuit of the main device when the remote device is separated from the main device.

In one aspect, a separable cellular telephone comprises:

a main device having a first radio circuit for communicating with a cell site and a second radio circuit; and a remote device having a radio circuit for communicating with the second radio circuit of the main device, wherein upon receipt of an incoming call from the cell cite, the main device transmits call receipt information to the remote device and the remote device processes the incoming call.

These and other objects, features and advantages of the present invention will become apparent from the following detailed description of illustrative embodiments, which are to be read in connection with the accompanying drawings.

DETAILED DESCRIPTION OF PREFERRED EMBODIMENTS

In the following description of preferred embodiments, it is to be understood that detailed descriptions of functions or constructions that are known to those skilled in the art have been omitted for the sake of clarity. It is to be further undersold that the term "cellular telephone" used herein refers to a separable cellular telephone which includes a main device and a remote device, wherein the main device is used for communicating with the cell site and the remote device is used for communicating with the main device so as to perform call service. It is to be appreciated that the cellular telephone can be designed such that the remote device can be attached and detached to and from the main device. Alternatively, the cellular telephone can be designed such that the remote device is always separated from the main device. It is to be understood that, in the following description, it is assumed that the remote device is separated from the main device.

Figure 1:
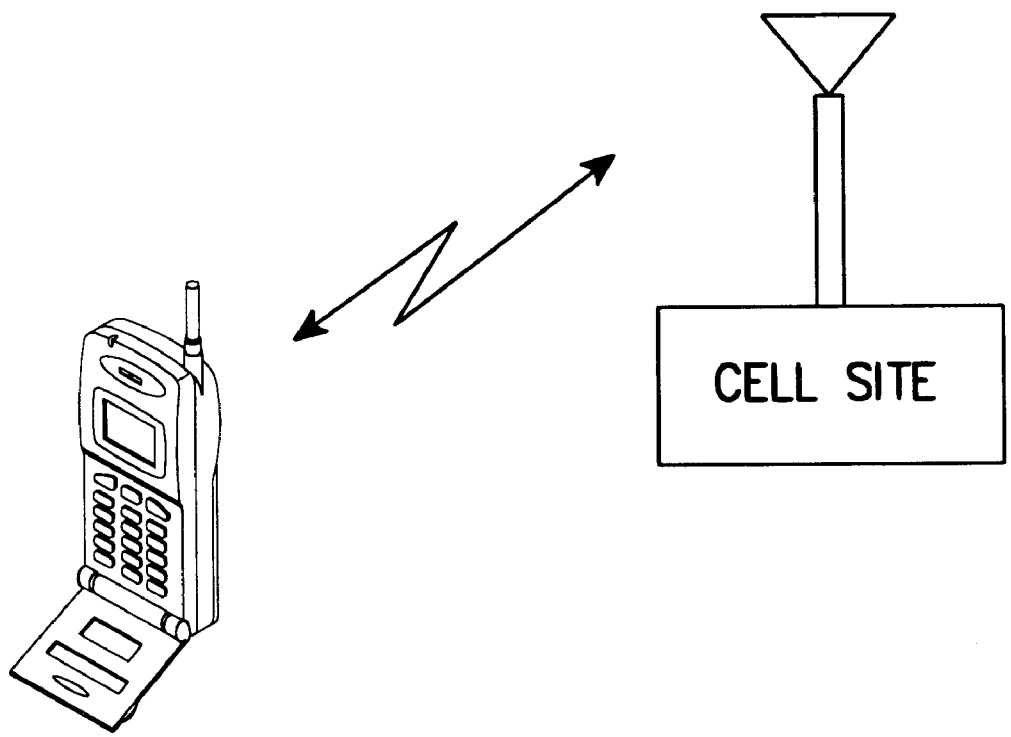
FIG. 1 is a diagram illustrating a communication link between a cellular telephone and a cell site.
Figure 2A:
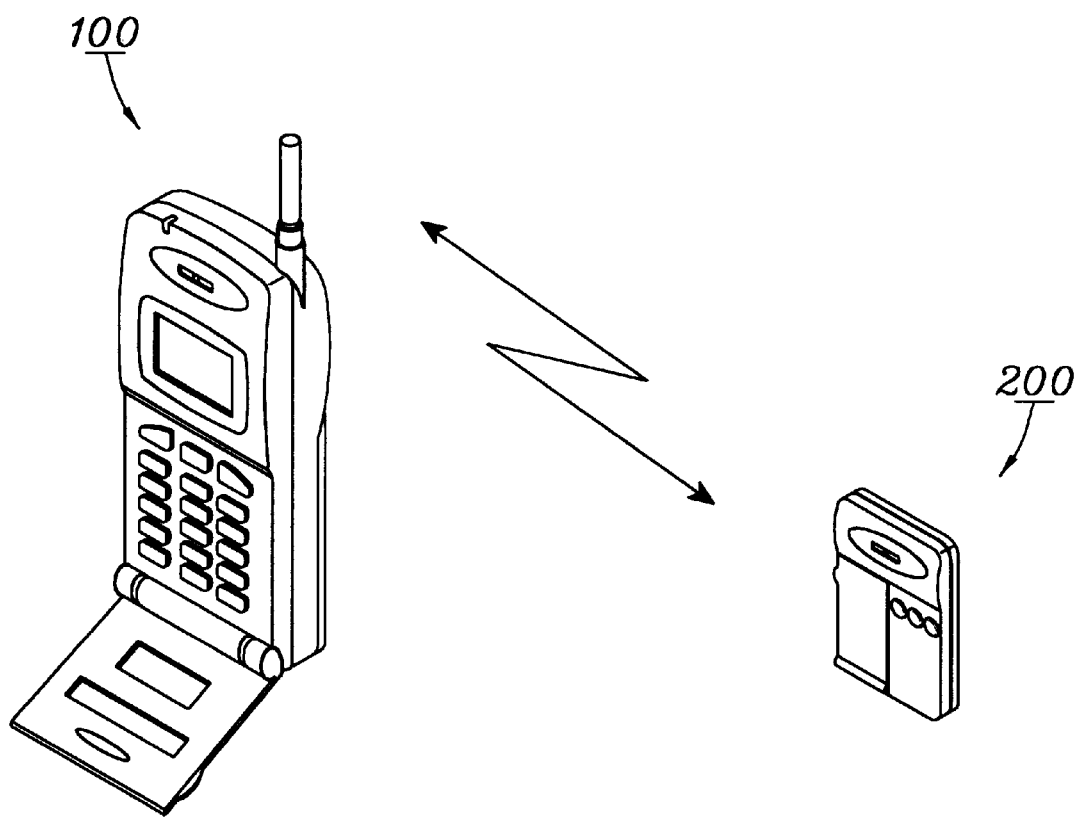
FIGS. 2A, 2B and 2C are diagrams illustrating a remote device of the cellular telephone which is separated from a main device according to an embodiment of the present invention.

Referring now to FIG. 2A, a cellular telephone in accordance with one aspect of the present invention has a main device 100 and a remote device 200, which are separate from eachother. The main device 100 includes a first radio circuit for providing radio communication with the cell site, and a second radio circuit for providing radio communication with the remote device 200. Further, the main device 100 may include a transceiver for performing voice communication with the cell site independent of the remote device 200. The remote device 200 includes a radio circuit for providing radio communication with the main device 100 and a transceiver for performing the voice communication.

As stated above, the main device 100 communicates with the cell site and the remote device 200 communicates with the main device 100, thereby performing the voice communication service. The remote device 200 is preferably designed to be thinner than 1 cm, so that it may be readily placed in a user's pocket. Consequently, the user can place the larger main device 100 in his/her handbag while separately placing the remote device 200 in his/her pocket. When an incoming call is received, the user can answer the call using the remote device 200.

Figure 2B:
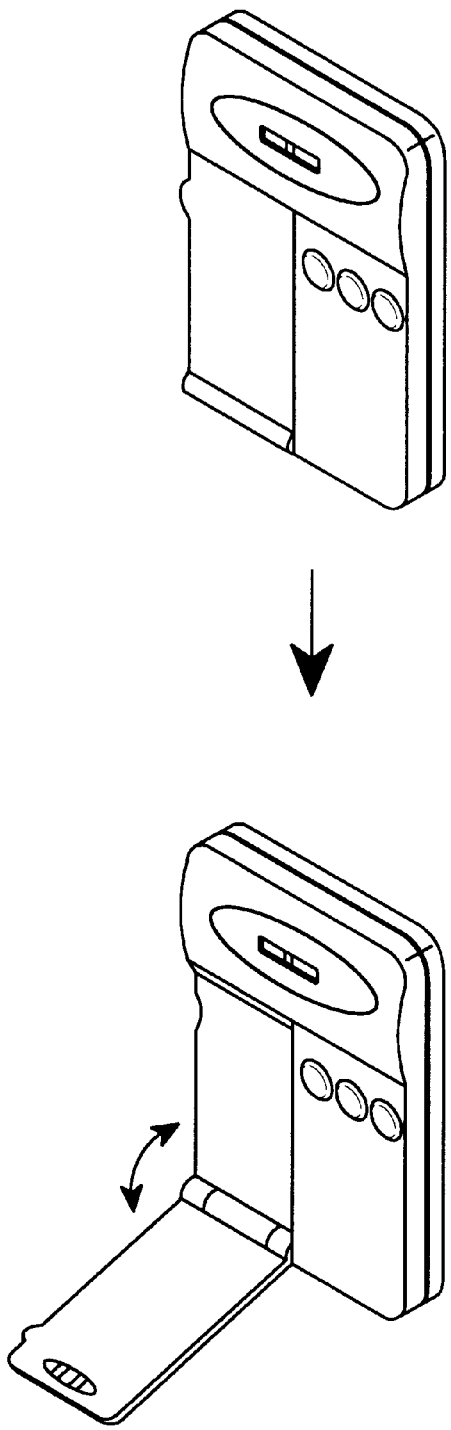
Figure 2C:
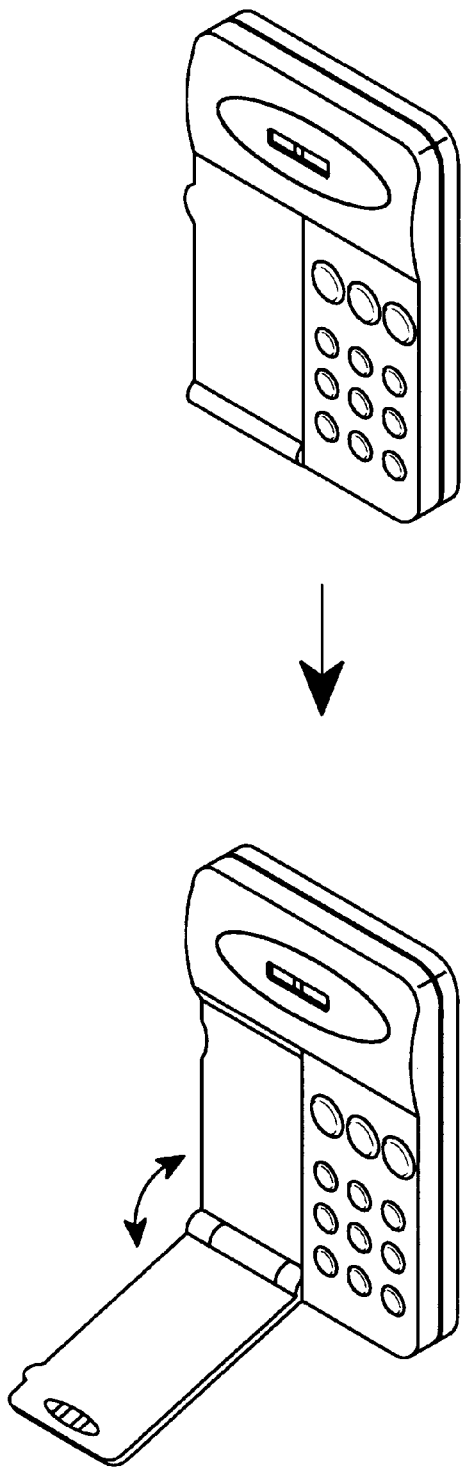

It is to be appreciated that the remote device 200 can be designed for receiving incoming calls only. Specifically, in this embodiment, the remote device 200 has a minimum number of keys, e.g., a SEND key, an END key and a power PWR key such as shown in FIG. 2B. It is to be further appreciated that the remote device can be designed such that it can receive incoming calls and make outgoing calls. In this embodiment, as shown in FIG. 2C, the remote device 200 includes the SEND key, the END key and the power PWR key, as well as numeric keys for dialing a phone number. The remote device 200 shown in FIG. 2C includes a separate controller and a circuit for generating a channel frequency.

Figure 3A:
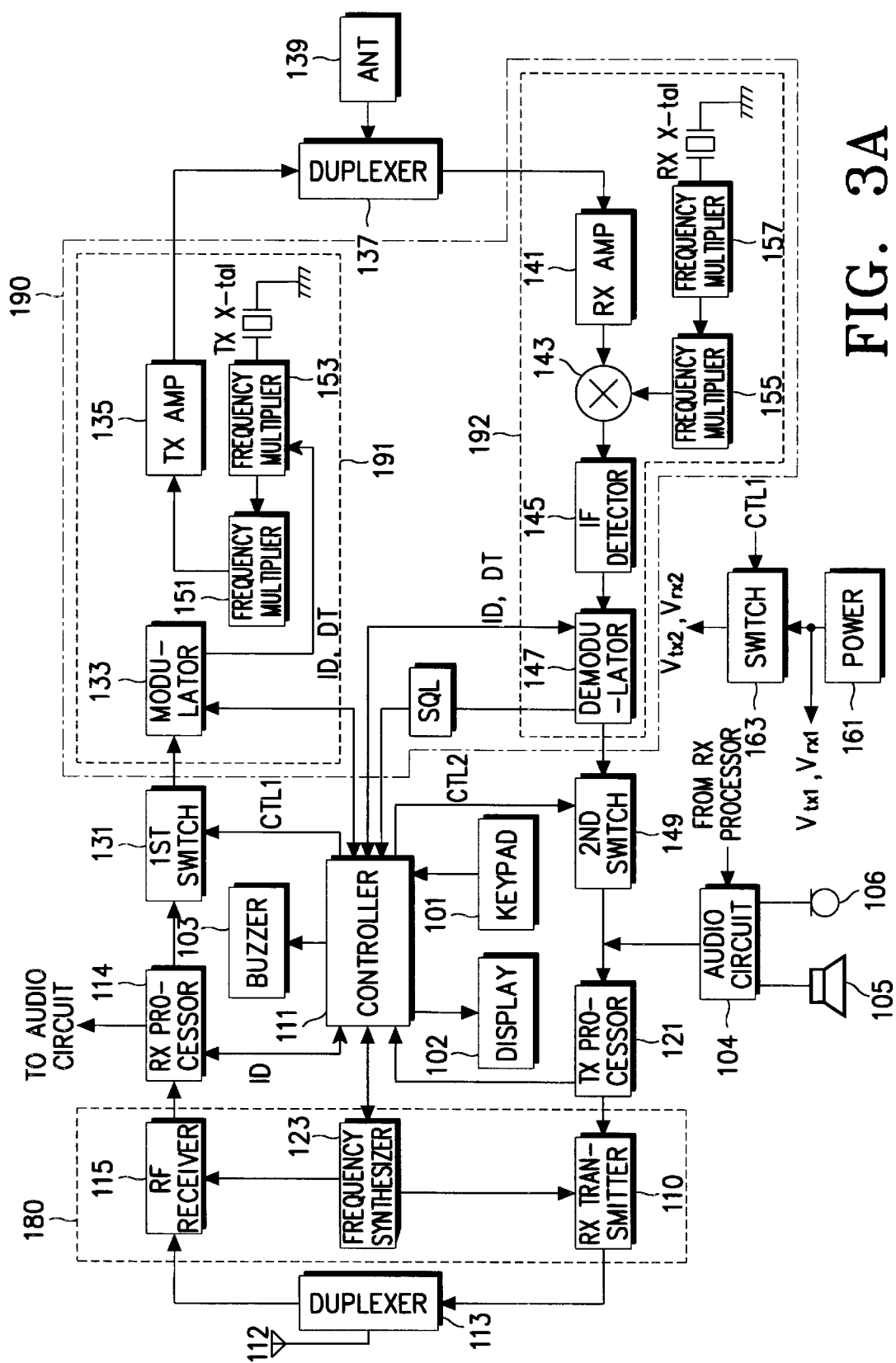
FIG. 3A is a block diagram illustrating a main device of the separable cellular telephone according to one embodiment of the present invention.

Referring now to FIG. 3A, a block diagram illustrates components of the main device 100 of the separable cellular telephone according to one embodiment of the present invention. A duplexer 113 connected to an antenna 112 separates the signal received from the cell site and the signal transmitted to the cell site. A first RF receiver 115 low-noise-amplifies, down-converts and demodulates the RF signal received from the duplexer 113. A first RF transmitter 110 modulates, up-converts and power-amplifies transmission data, and outputs the RF transmission signal to the duplexer 113. A frequency synthesizer 123 generates local oscillation frequencies for designating transmission and reception channels according to a control signal received by a controller 111, and provides the first RF receiver 115 and the first RF transmitter 110 with the reception and transmission local oscillation frequencies, respectively. The duplexer 113, the first RF receiver 115, the first RF transmitter 110, and the frequency synthesizer 123 constitute a first radio circuit 180.

A reception processor 114 decodes the reception signal output from the first RF receiver 115, provides control data to the controller 111, and provides a received voice signal to an audio circuit 104 and a first switch 131. A transmission processor 121 encodes a transmission audio signal which is output from either the audio circuit 104 or a second switch 149. The transmission processor 121 also encodes transmission control data output from the controller 111 and outputs the encoded transmission data to the first RF transmitter 110. The reception processor 114 and the transmission processor 121 can be realized using a digital signal processor (DSP).

The controller 111, which controls the general operation of the main device 100, includes a first memory for storing a control program and a second memory for temporarily storing data generated during operation of the control program. A keypad 101 generates key commands and dialing key data to the controller 111 according to a key manipulation by the user. A display 102 displays an operating status of the cellular telephone under the control of the controller 111. A buzzer 103 generates a ring tone under the control of the controller 111 to indicate receipt of an incoming call. The audio circuit 104, which is connected to a microphone 106 and a speaker 105, reproduces an audio signal that is output from the reception transmitter 114 and outputs the reproduced audio signal via the speaker 105. The audio circuit also outputs a voice signal generated from the microphone 106 to the transmission processor 121. The controller 111 activates a first control signal CTL1 upon detection of an incoming call, activates a second control signal CTL2 upon detection of call answering data, and inactivates the first and second control signals CTL1 and CTL2 upon detection of call end data.

The first switch 131, which is connected to the reception processor 114, is activated in response to the first control signal CTL1 to form a signal path between the reception processor 114 and a modulator 133. At the circuit designer's option, the first switch 131 may be removed with the output of the reception processor 114 being directly connected to the input of the modulator 133. The first switch 131 functions to block a signal path formed between the main device 100 and the remote device 200 when the user makes a call using the main device 100. Specifically, after receiving a key command representing non-use of the remote device 200 from the keypad 101, the controller 111 deactivates the first control signal CTL1 to turn off the first switch 131, thereby cutting off the signal path.

The main device 100 is provided with the power supply voltage from a power supply 161 (e.g., a battery). A power switch 163 is connected between the power supply 161 and a power terminal of a second radio circuit 190. The power switch 163 is controlled by the first control signal CTL1. The power switch 163 is activated in response to the first control signal CTL1 to provide the power supply voltages Vtx2 and Vrx2 to a second RF transmitter 191 and a second RF receiver 192, respectively.

The second RF transmitter 191 includes a first frequency multiplier 153 which multiplies a reference frequency output from a crystal oscillator TX_X-tal by a specified number. A second frequency multiplier 151 multiplies an output frequency of the first frequency multiplier 153 by a specified number to generate a reception band frequency of the remote device 200. The modulator 133, which is connected to the first switch 131, modulates and up-converts the signal received via the first radio circuit 180 to the reception band frequency of the remote device 200 by using the output frequency of the first frequency multiplier 153. The modulator 133 may include an ID (identification) generator of the main device 100, for identifying the radio communication with the remote device 200. A transmission amplifier 135 amplifies the signal output from the modulator 133 and outputs the amplified signal to a duplexer 137. It is to be understood that elements 133, 135, 151 and 153 constitute the second RF transmitter 191 which transmits the RF transmission signal to the remote device 200.

The second RF receiver 192 includes a reception amplifier 141 for amplifying a transmission signal received from the remote device 200 via the duplexer 137. A third frequency multiplier 157 multiplies a reference frequency output from a crystal oscillator RX_T-tal by a specified number. A fourth frequency multiplier 155 multiplies an output frequency of the third frequency multiplier 157 by a specified number to generate a frequency which is added to and subtracted from the transmission band frequency of the remote device 200 via a mixer 143, which mixes the output of the reception amplifier 141 with an output of the fourth frequency multiplier 155 to generate intermediate frequencies (IF). An IF detector 145 selects the down-converted intermediate frequency from the intermediate frequencies output from the mixer 143. A demodulator 147 amplifies and demodulates the intermediate frequency output from the IF detector 145. The demodulator 147 may include an RSSI (Received Signal Strength Indicator) detector and a discriminator for discriminating ID data of the remote device 200. The second switch 149, which is connected between the demodulator 147 and the transmission processor 121, is activated in response to the second control signal CTL2 generated by the controller 111 to form a transmission path for the remote device 200. It is to be understood that the elements 141, 143, 145, 147, 155 and 157 constitute the second RF receiver 192 which receives the RF transmission signal from the remote device 200. It is to be further understood that the second RF transmitter 191 and the second RF receiver 192 constitute a second radio circuit 190.

The duplexer 137 separates the transmission and reception RF signals that are transmitted between the main device 100 and the remote device 200 and received via an antenna 139. The antenna 139 may be a loop pattern antenna which is a built-in type antenna. It is to be appreciated that, since the transmission frequency and the reception frequency are different, the main device 100 may be structured such that the second RF transmitter 191 and the second RF receiver 192 have separate antennas, in which case the duplexer 137 may be removed.

Figure 3B:
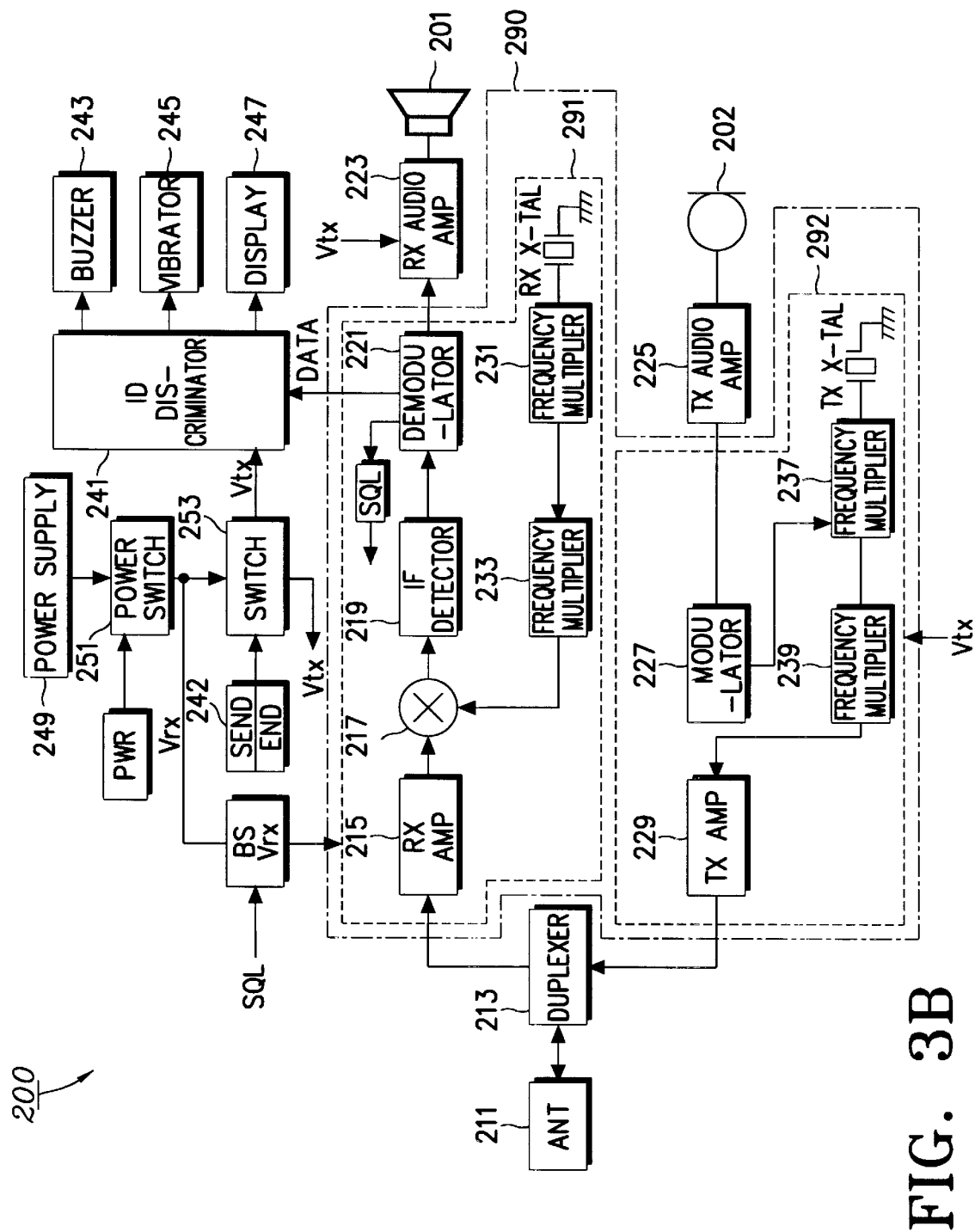
FIG. 3B is a block diagram illustrating a remote device of the separable cellular telephone according to one embodiment of the present invention.

Referring now to FIG. 3B, a block diagram illustrates the remote device of the separable cellular telephone according to the first embodiment of the present invention. The remote device 200 of FIG. 3B is used in conjunction with the main device 100 of FIG. 3A. In FIG. 3B, an antenna 211 may be the loop pattern antenna similar to the antenna 139 of the main device 100 (FIG. 3A). A duplexer 213 separates the transmission and reception RP signals which are transmitted between the remote device 200 and the main device 100.

A reception amplifier 215 amplifies a transmission signal that is received from the main device 100 via the duplexer 213. A fifth frequency multiplier 231 multiplies a reference frequency output from a crystal oscillator RX_X-TAL by a specified number. A sixth frequency multiplier 233 multiplies the output frequency of the fifth frequency multiplier 231 by a specified number to generate the reception band frequency of the remote device 200. A mixer 217 mixes the output of the reception amplifier 215 with the output of the sixth frequency multiplier 233 to generate intermediate frequencies. An IF detector 219 selects the down-converted intermediate frequency from the intermediate frequencies output from the mixer 217. A demodulator 221 demodulates the intermediate frequency output from the IF detector 219. A transmission audio amplifier 223 amplifies an audio signal output from the demodulator 221 and outputs the amplified audio signal to a speaker (or receiver) 201. It is to be understood that elements 215, 217, 219, 221, 231 and 233 constitute an RF receiver 291.

A keypad 242 includes a SEND key for answering an incoming call from the main device 100, an END key for ending (or terminating) the call, and a power key PWR. It is to be understood that the embodiment of FIG. 3B refers to the remote device 200 of FIG. 2B which is configured to receive incoming calls only. A discriminator 241 discriminates the output of the demodulator 221 and the keypad 242, and generates a call control signal for controlling the operation of the remote device 200. Specifically, upon detection of ID data output from the main device 100, the discriminator 241 generates the call control signal for notifying the user of an incoming call. Further, the discriminator 241 analyzes an output of the demodulator 221 and actuates a display 247 (which is, e.g., a light emitting diode (LED)) and a buzzer 243 or a vibrator 245 when the demodulated data is the ID data of the main device 100. In addition, the discriminator 241 activates a power control signal PWR when the power key PWR is pressed, generates a call answering signal SEND when the SEND key (i.e., call answering key) is pressed, and generates a call end signal END when the END key (i.e., call end key) is pressed. The buzzer 243 generates a ring tone in response to the call control signal output from the discriminator 241. The vibrator 245 drives a motor to vibrate the remote device 200 in response to the call control signal output from the discriminator 241. The display 247 (LED) indicates the call receipt state in response to the call control signal output from the discriminator 241.

A power supply 249 (e.g., a rechargeable battery) provides power supply voltage to the remote device 200. A power switch 251 is controlled by the power key PWR (which is mounted on the casing of the remote device 200) and is activated to provide the power supply voltage to the remote device 200 in response to the power control signal PWR generated from the discriminator 241. The switch 253 is activated and deactivated by the SEND key and the END key (which are also mounted on the casing of the remote device 200), respectively, to either provide or cut-off the power supply voltage Vtx to an RF transmitter 292 in the remote device 200.

A transmission audio amplifier 225 amplifies a transmission audio signal output from a microphone (or transmitter) 202. A seventh frequency multiplier 237 multiplies a reference frequency output from a crystal oscillator TX_X-TAL by a specified number. An eighth frequency multiplier 239 multiplies an output frequency of the seventh frequency multiplier 237 by a specified number to generate a transmission band frequency of the remote device 200. A modulator 227 modulates a transmission audio signal output from the transmission audio amplifier 225 by using an output frequency of the seventh frequency multiplier 237, to up-convert the transmission audio signal to the transmission band frequency of the remote device 200. A transmission amplifier 229 amplifies a transmission signal output from the eight frequency multiplier 239 and outputs the amplified transmission signal to the duplexer 213. It is to be understood that elements 227, 229, 237, and 239 constitute an RF transmitter 292.

The operation of the cellular telephone according to the first embodiment of the present invention will now be discussed with reference to FIGS. 3A and 3B. In general, the main device 100 (FIG. 3A) communicates with the cell site via the first radio circuit 180 and communicates with the remote device 200 (FIG. 3B) via the second radio circuit 190. When the remote device 200 (FIG. 3B) is set to an operation mode by the user, the power switch 251 is activated to provide the power supply voltage Vrx to the RF receiver 291 of the remote device 200. Then, when call request data is received by the main device 100 from the cell site, the first RF receiver 115 and the reception processor 114 provide the controller 111 with data to inform the receipt of the incoming call. The controller 111 then actuates the buzzer 103 and the display 102 to notify the receipt of the incoming call. Further, the controller 111 generates the first control signal CTL1 to form a radio link between the second RF transmitter 191 of the main device 100 and the RF receiver 291 of the remote device 200.

Specifically, in response to the first control signal CTL1, the first switch 131 is activated to connect the reception processor 114 to the modulator 133, and the power switch 163 is activated to provide the power supply voltages Vtx2 and Vrx2 to the second RF transmitter 191 and the second RF receiver 192, respectively. In addition, the controller 111 drives the ID generator in the modulator 133 to generate ID data which is used for notifying the receipt of incoming call to the remote device 200. The modulator 133 (which includes the ID generator) generates the ID data of the main device 100 when the first control signal CTL1 is activated, and modulates and up-converts the ID data by using the output frequency of the first frequency multiplier 153.

The transmission and reception frequencies that are communicated between and among the cell site, the main device 100, and the remote device 200 will now be discussed. The first radio circuit 180 in the main device 100 operates with a specified CDMA (Code Division Multiple Access) or PCS (Personal Communication Services) frequency to communicate with the cell site. The second radio circuit 190 in the main device 100, however, utilizes a radio frequency that is different from the radio frequency used by the first radio circuit 180. The radio frequency used in the second radio circuit 190, however, must coincide with a radio frequency used in the remote device 200. By way of example, assuming the reception and transmission frequency of the remote device 200 are set to 250 MHz and 380 MHz, respectively, then the transmission and reception frequency (in the second radio circuit 190) of the main device 100 must be 250 MHz and 380 MHz, respectively.

The second RF transmitter 191 (in the main device 100) is preferably designed such that the crystal oscillator TX_X-tal generates a reference frequency of 16.66 MHz. The first frequency multiplier 153 multiplies the reference frequency by 3 to generate a frequency of 50 MHz, and then the second frequency multiplier 151 multiplies the output frequency of the first frequency multiplier 153 by 5 to generate a frequency of 250 MHz. Further, the second RF receiver 192 (in the main device 100) is preferably designed such that the crystal oscillator RX_X-tal generates a reference frequency of 23.93 MHz. The third frequency multiplier 157 multiplies the reference frequency by 3 to generate a frequency of 71.8 MHz, and then the fourth frequency multiplier 155 multiplies the output frequency of the third frequency multiplier 157 by 5 to generate a frequency of 359 MHz.

Further, the RF receiver 291 (in the remote device 200) is preferably designed such that the crystal oscillator RX_X-TAL generates a reference frequency of 15.393 MHz. The fifth frequency multiplier 231 multiplies the reference frequency by 3 to generate a frequency of 46 MHz, and the sixth frequency multiplier 233 multiplies the output frequency of the fifth frequency multiplier 231 by 5 to generate a frequency of 230 MHz. The RF transmitter 292 (in the remote device 200) is preferably designed such that the crystal oscillator TX_X-TAL generates a reference frequency of 25.33 MHz. The seventh frequency multiplier 237 multiplies the reference frequency by 3 to generate a frequency of 76 MHz, and then the eighth frequency multiplier 239 multiplies the output frequency of the seventh frequency multiplier 237 by 5 to generate a frequency of 380 MHz. In this case, the intermediate frequency of the first and second RF receivers 115 and 192 in the main device 100 may be set to 20 MHz.

The RF signal received by the first RF receiver 115 is delivered to the modulator 133 via the reception processor 114 and the first switch 131. The modulator 133 applies the data from reception processor 114 to the first frequency multiplier 153 to modulate it, and then the second frequency multiplier 151 multiplies the output of the first frequency multiplier 153 by 5. Then, the transmission amplifier 135 amplifies the modulated signal which is then transmitted via the duplexer 137 and the antenna 139.

It is to be appreciated that the transmission amplifier 135 amplifies the modulated signal into a low-power radio wave so that the coverage (i.e., the maximum communicable distance between the main device 100 and the remote device 200) is approximately 3–5 m. A communication distance of approximately 3–5 m is sufficient since the distance between the two devices generally does not exceed several meters when the user puts the main device 100 in the handbag and the remote device 200 in the pocket. Advantageously, use of the low-power radio wave for communication between the main device 100 and the remote device 200 contributes to minimization of battery power consumption for the two devices. Further, in order to improve communication reliability (or a communication success rate) between the main device 100 and the remote device 200, the cellular telephone uses a radio frequency which is not used by other radio communication systems. Moreover, the low-power radio wave may not be under the control of the radio wave control law.

Next, when the power switch 251 in the remote device 200 is activated, the reception power supply voltage Vrx is provided to the RF receiver 291 in the remote device 200. Then, the low-power radio wave received (from the main device 100) via the antenna 211 and the duplexer 213 is low-noise-amplified by the reception amplifier 215 and applied to the mixer 217. The signal output from the second RF transmitter 191 in the main device 100 has the frequency of 250 MHz (as demonstrated above) and the output signal of the sixth frequency multiplier 233 in the remote device 200 has the frequency of 230 MHz. The mixer 217 mixes these two signals and generates frequencies which equivalent to the addition and subtraction of the 250 MHz and 230 MHz signals. The IF detector 219 selects the subtracted frequency of 20 MHz as its output intermediate frequency. The demodulator 221 down-converts the intermediate frequency of 20 MHz to a lower frequency of 455 KHz and demodulates it into the original data.

Next, the discriminator 241 analyzes the output data of the demodulator 221 to determine whether it is coincident with the ID data of the main device 100. If the demodulated data coincides with the ID data of the main device 100, the discriminator 241 drives the display 247, the buzzer 243 or the vibrator 245 to notify the user of the receipt of an incoming call. Moreover, in order to provide the power supply voltage Vtx to the RF transmitter 292, the discriminator 241 activates a transmission power control signal, which activates the switch 253 to form a path for the transmission power supply voltage Vtx. Then, the RF transmitter 292 is enabled (with the power supply voltage Vtx) to perform the call service.

Next, when the user senses receipt of the incoming call and presses the SEND key, the discriminator 241 outputs a call control signal SND to the modulator 227. In response to the call control signal SND, the modulator 227 drives the ID generator (which is included therein) to generate call answering ID data (the call answering ID data may be ID data of the remote device 200). Further, the modulator 227 modulates the call answering ID data and loads the modulated data into the 380 MHz radio frequency output from the eighth frequency multiplier 239. The transmission amplifier 229 amplifies the output of the eighth frequency multiplier 239 and transmits the amplified transmission signal via the duplexer 213 and the antenna 211.

Next, the antenna 139 and the duplexer 137 in the main device 100 receive the transmission signal from the remote device 200 and sends it to the reception amplifier 141 which low-noise amplifies the received signal. Here, the signal transmitted from the remote device 200 has the frequency of 380 MHz. The mixer 143 mixes the received 380 MHz signal with the 359 MHz signal output from the frequency multiplier 155, to generate frequencies equal to the sum and difference signal between the two signals. The IF detector 145 selects the difference signal (i.e., 21 MHz signal) as the intermediate frequency. The demodulator 147 down-converts the 21 MHz signal to a 455 KHz signal and demodulates the converted signal.

The demodulator 147 includes the ID detector, which analyzes the demodulated data to determine whether it coincides with the ID data of the remote device 200, and then applies the demodulated data to the controller 111 if it coincides with the ID data of the remote device 200. The controller 111 then activates the second control signal CTL2 which activates the second switch 149 to form the signal path between the demodulator 147 and the transmission processor 121. Accordingly, an RF link is formed between the second radio circuit 190 in the main device 100 and the remote device 200. The remote device 200 continues to activate the switching control signal for the switch 253 until the user ends the call.

Once the incoming call service function is selected (i.e., the RF link between the main device 100 and the remote device 200 is formed), the RF signal received from the cell site is applied to the modulator 133 in the second RF transmitter 191 via the first RF receiver 115, the reception processor 114, and the first switch 131. The second RF transmitter 191 up-converts the received signal to the reception band frequency (250 MHz) of the remote device 200. Then, the RF receiver 291 in the remote device 200 down-converts and demodulates the transmission signal output from the second RF transmitter 191 of the main device 100, and the reception audio amplifier 223 amplifies the demodulated audio signal and outputs it through the speaker 201. In addition, the audio signal output from the microphone 202 is amplified by the transmission audio amplifier 225 and applied to the RF transmitter 292, which up-converts the audio signal to the reception band frequency (250 MHz) of the second RF receiver in the main device 100 and transmits it via the duplexer 213 and the antenna 211. Then, the second RF receiver 192 in the main device 100 down-converts and demodulates the transmission signal received from the RF transmitter 292 of the remote device 200, and the demodulated signal is transmitted to the cell site via the second switch 149, the transmission processor 121, and the first RF transmitter 110.

As described above, while performing the incoming call service, the main device 100 converts the received RF signal to the reception frequency band of the remote device 200 and converts the signal transmitted from the remote device 200 to the frequency band of the cell site. In this manner, the remote device 200 can communicate with the cell site via the main device 100.

During the incoming call service, call end data may be issued from either the cell site or the remote device 200. For example, the user may issue the call end command by pressing the END key on the remote device 200. The remote device 200 generates a call end signal END when the END key is pressed. In response to the call end signal END, the modulator 227 drives the ID generator to generate call end ID data requesting the call termination. It is to be understood that the call end ID data is different from the ID data of the remote device 200. Accordingly, the remote device 200 should generate two different ID data; one for the ID data used in answering the incoming call, and another for the call end ID data. The modulator 227 modulates the call end ID data and the eight frequency multiplier 239 loads the modulated data into its output frequency to up-convert it to the reception band frequency of the main device 100. Then, the second RF receiver 192 in the main device 100 receives the call end ID data transmitted from the remote device 200, and the ID detector in the demodulator 147 detects the call end ID data and provides it to the controller 111.

On the other hand, if call end data is received from the cell site, the controller 111 detects it through the reception processor 114. Upon detection of call end data, the controller 111 causes the modulator 133 to generate call end ID data. The generated call end ID data is transmitted to the remote device 200 via the second RF transmitter 191. The RF receiver 291 in the remote device 200 then demodulates the call end ID data received from the main device 100. The discriminator 241 determines whether the ID data output from the demodulator 221 is the call end ID data. If so, the discriminator 241 deactivates the switch 253 to cut off the power supply voltage Vtx to the RF transmitter 292, thereby saving the battery. Further, when the call is ended, the controller 111 in the main device 100 deactivates the first and second control signals CTL1 and CTL2 to turn off the first and second switches 131 and 149, so as to cut off the signal paths between the remote device 200 and the main device 100.

Figure 4A:
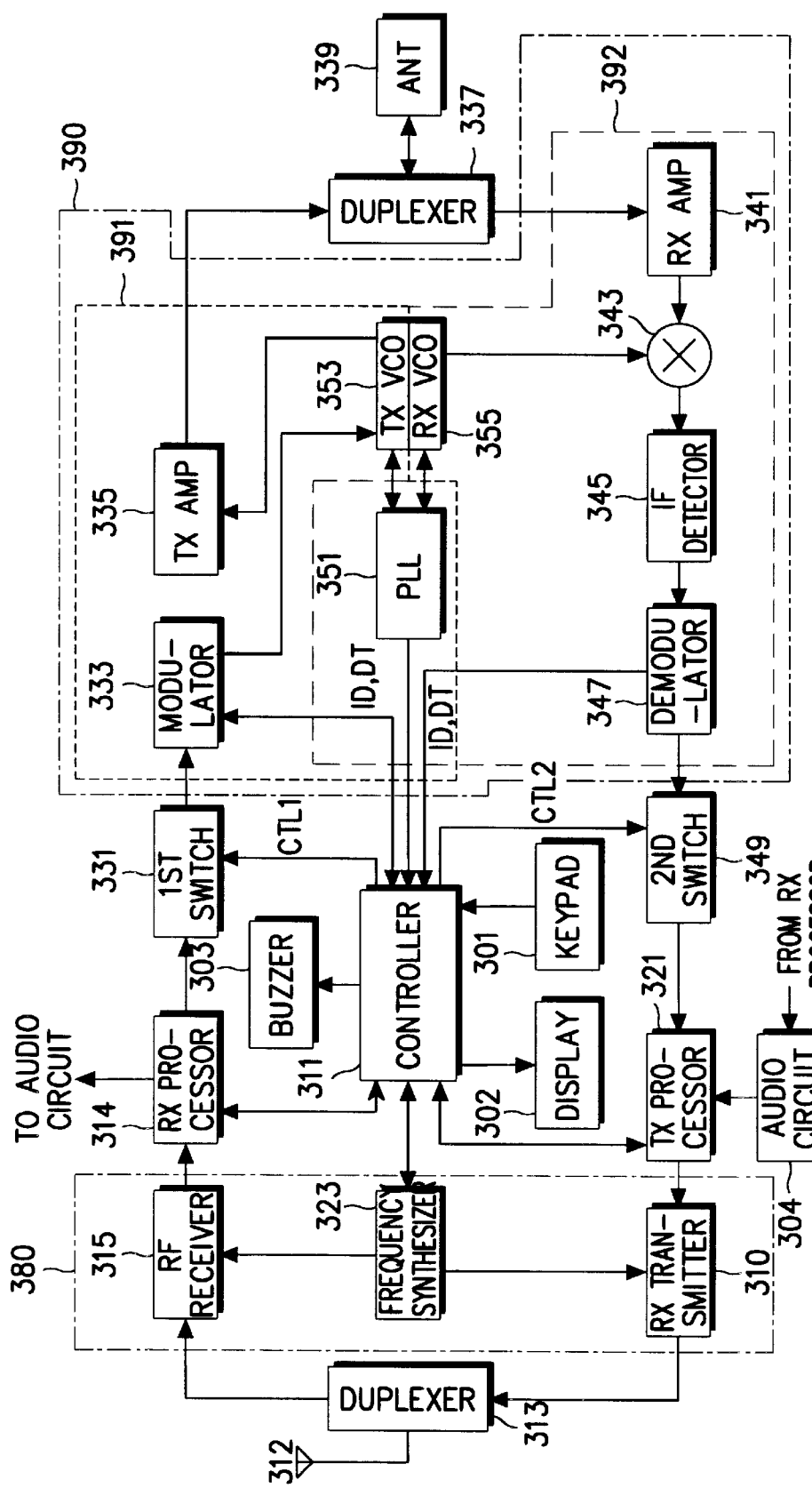
FIG. 4A is a block diagram illustrating a main device of the separable cellular telephone according to another embodiment of the present invention.
Figure 4B:
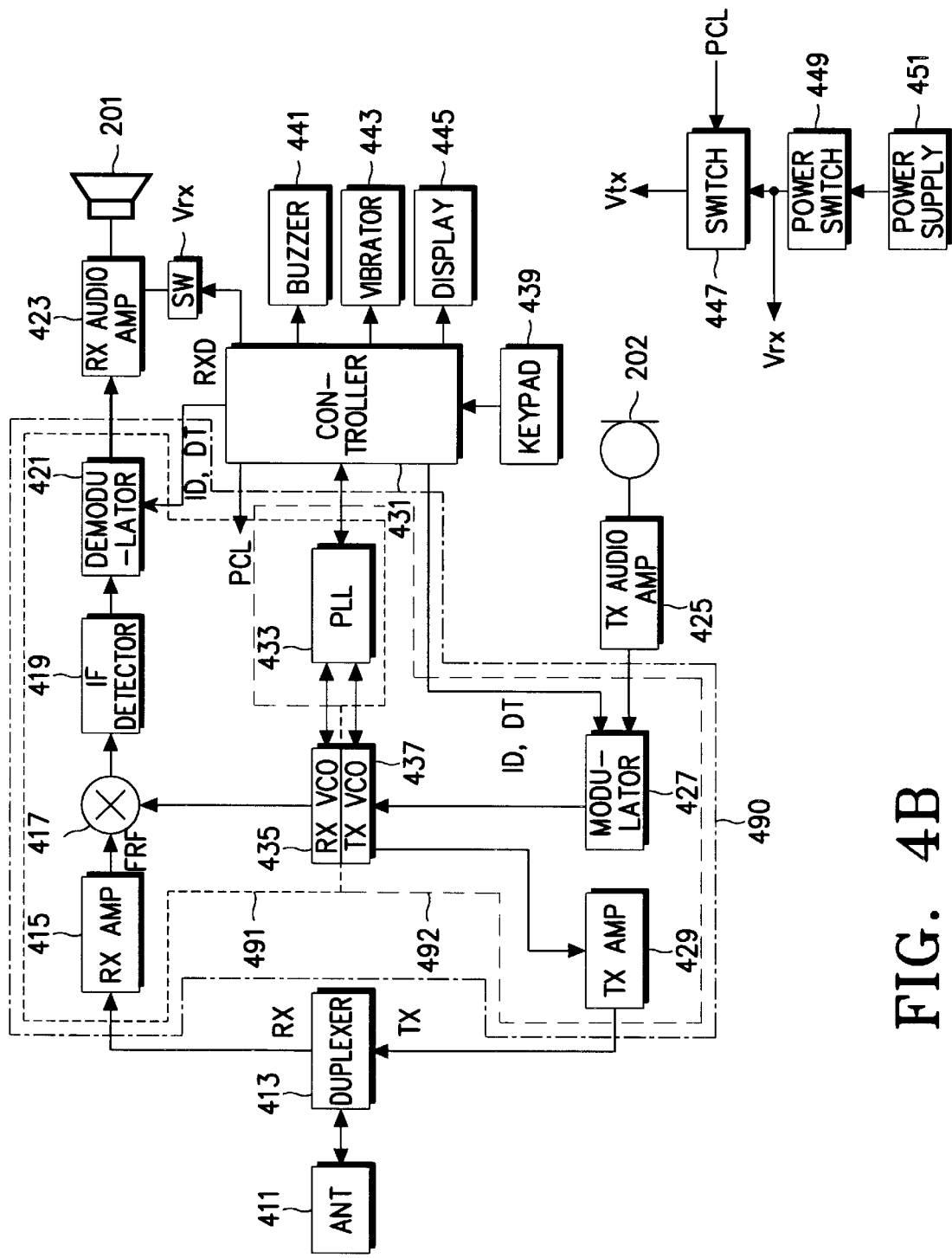
FIG. 4B is a block diagram illustrating a remote device of the separable cellular telephone according to another embodiment of the present invention.

FIGS. 4A and 4B are block diagrams of the main device 100 and the remote device 200, respectively, in accordance with a second embodiment of the present invention. In this embodiment, the main device 100 and the remote device 200 communicate with each other using transmission and reception frequencies of several channels.

Referring now to FIG. 4A, a duplexer 313 connected to an antenna 312 separates the signal received from the cell site and the signal transmitted to the cell site. A first RF receiver 315 low-noise-amplifies, down-converts and demodulates the RF signal received from the duplexer 313. A first RF transmitter 310 modulates, up-converts and power-amplifies transmission data input, and outputs the RF transmission signal to the duplexer 313. A frequency synthesizer 323 generates local oscillation frequencies for designating transmission and reception channels according to a control signal received from the controller 311, and provides the first RF receiver 315 and the first RF transmitter 310 with the reception and transmission local oscillation frequencies, respectively. The duplexer 313, the first RF receiver 315, the first RF transmitter 310, and the frequency synthesizer 323 constitute a first radio circuit 380.

A reception processor 314 decodes the reception signal output from the first RF receiver 315, provides control data to the controller 311 and provides a voice signal to an audio circuit 304 and a first switch 331. A transmission processor 321 encodes a transmission audio signal output from the audio circuit 304 or a second switch 349 and transmission control data output from the controller 311, and outputs the encoded transmission signal to the first RF transmitter 310. It is to be appreciated that the reception processor 314 and the transmission processor 321 can be realized by a digital signal processor (DSP).

The controller 311, which controls the general operation of the main device 100, includes a first memory for storing a control program and a second memory for temporarily storing data generated in the process of the control program. A keypad 301 generates key commands and dialing key data to the controller 311 according to a key manipulation by the user. A display 302 displays an operating status of the cellular telephone under the control of the controller 311. A buzzer 303 generates a ring tone representing receipt of the incoming call under the control of the controller 311. The audio circuit 304, which is connected to a microphone (or transmitter) 306 and a speaker (or receiver) 305, reproduces the audio signal output from the reception transmitter 314 and outputs it via the speaker 305, and outputs the voice signal generated from the microphone 306 to the transmission processor 321. The controller 311 activates a first control signal CTL1 to generate call start data upon detection of the incoming call via the reception processor 314, activates a second control signal CTL2 upon detection of the call answering data, and inactivates the first and second control signals CTL1 and CTL2 upon detection of the call end data. In addition, the controller 311 generates the first and second control signals CTL1 and CTL2 to generate the call answering data upon detection of an outgoing call (via a demodulator 347) which originates from the remote device 200, and deactivates the first and second controls signals CTL1 and CTL2 upon detection of call end data.

The first switch 331, connected to the reception processor 314, is activated in response to the first control signal CTL1 to form a signal path between the reception processor 314 and a modulator 333. When the user makes a call using the main device 100, the first switch 131 functions to block a second transmission path formed between the main device 100 and the remote device 200. That is, upon receipt of a key command representing nonuse of the remote device 200 from the keypad 301, the controller 311 deactivates the first control signal CTL1 to turn off the first switch 331, thereby cutting off the signal path between the reception processor 314 and the second RF transmitter 391. At the circuit designer's option, the first switch 131 may be removed, in which case the output of the reception processor 114 is directly connected to the input of a modulator 133.

A PLL (Phase Locked Loop) 351 generates (in accordance with control data output from the controller 311) a first PLL control signal for generating a frequency which is identical to a reception band frequency of the remote device 200, as well as a second PLL signal for generating a frequency which is identical to a transmission band frequency of the remote device 200. A transmission voltage controlled oscillator (TX_VCO) 353 generates the reception band frequency of the remote device 200 according to the output of the PLL 351, and a reception voltage controlled oscillator (RX_VCO) 355 generates the transmission band frequency of the remote device 200 according to the output of the PLL 351. By utilizing the PLL 351, the TX_VCO 353 and the RX_VCO 355, the main device 100 can set the channel frequency to form an optimal RF communication link with the remote device 200 via a channel scanning operation. In particular, in an idle state, the main device 100 communicates with the remote device 200 to select one of the available channels which has the highest RSSI (Received Signal Strength Indicator) level. This channel scanning technique is well known in the art and, accordingly, a detailed description will not be provided herein.

The modulator 333, which is connected to the first switch 331, modulates a signal received via the first radio circuit 380 and up-converts the modulated signal to the reception band frequency of the remote device 200 by using the channel frequency output from the TX_VCO 353. Further, the modulator 333 may include an ID generator which is used for transmitting and receiving the audio signal to and from the remote device 200. It is to be understood, however, that the controller 311 may be configured to generate ID data (in which case the modulator 333 will not include the ID generator). The following discussion assumes that the modulator 333 does not include the ID generator. A transmission amplifier 335 amplifies a signal output from the modulator 333 and outputs the amplified signal to a duplexer 337. It is to be understood that the elements 333, 335, 351, and 353 constitute a second RF transmitter 391 for transmitting a radio transmission signal to the remote device 200.

A reception amplifier 341 amplifies a transmission signal received from the remote device 200 via the duplexer 337. A mixer 343 mixes an output of the reception amplifier 341 with a channel frequency output from the RX_VCO 355 to generate intermediate frequencies. An IF detector 345 selects a down-converted intermediate frequency from the intermediate frequencies which are output from the mixer 343. A demodulator 347 demodulates the intermediate frequency output from the IF detector 345. The demodulator 347 may include an ID detector for discriminating the ID data of the remote device 200. However, when the controller 311 is configured to detect the ID data, the demodulator 347 will not include the ID detector. It is assumed in the following discussion that the demodulator 347 does not include the ID detector. A second switch 349, connected between the demodulator 347 and the transmission processor 321, is activated in response to the second control signal CTL2 output from the controller 311, so as to form a transmission path for the remote device 200. It is to be understood that the elements 341, 343, 345, 347, 351 and 355 constitute a second RF receiver 392 for receiving the radio transmission signal from the remote device 200. It is to be further understood that the second RF transmitter 391 and the second RF receiver 392 constitute a second radio circuit 390.

The duplexer 337 separates the transmission signal to the remote device 200 and the reception signal from the remote device 200. An antenna 339 may be a loop pattern antenna which is a built-in type antenna.

Referring now to FIG. 4B, a block diagram illustrates a remote device 200 in accordance with the second embodiment of the present invention. An antenna 411 may be a loop pattern antenna similar to the antenna 339 of the main device 100. A duplexer 413 splits the RF transmission and reception signals transmitted between the remote device 200 and the main device 100.

A controller 431, which controls the overall operation of the remote device 200, includes a program memory for storing a program for controlling the radio communication between the main device 100 and the remote device 200 and a temporal memory for temporarily storing data generated in the process of executing the control program. A keypad 439 generates key data for setting various functions of the remote device 200 and provides the key data generated to the controller 431. A buzzer 441 generates a ring tone notifying receipt of the incoming call under the control of the controller 431. A vibrator 443 drives a motor to vibrate the remote device 200 upon receipt of the incoming call under the control of the controller 431. A display 445 displays an operating status of the remote device 200 under the control of the controller 431. The display 445 may be an LCD (Liquid Crystal Display) or LED.

The keypad 439 can be designed differently according to the function of the remote device 200. For instance, as indicated above, when the remote device 200 is designed to only receive incoming calls, the keypad 439 includes the SEND key, the END key, and the PWR key (as shown in FIG. 2B). However, when the remote device 200 is designed to receive incoming calls and make outgoing calls, the keypad 439 further includes function keys for setting various functions of the remote device 200, as well as numeric keys for dialing the telephone number (as shown in FIG. 2C). In addition, the controller 431 includes a program for processing the key data output from the keypad 439 according to whether the remote device 200 is utilized for incoming calls only or for both incoming and outgoing calls.

A power supply 451 (e.g. a battery) provides a power supply voltage to the remote device 200. A power switch 449 is controlled by a power key on the keypad 439, and is turned on when a user presses the power key which provides the reception power supply voltage Vrx and the transmission power supply voltage Vtx. A switch 447 is activated to supply the transmission power supply voltage Vtx, in response to a power control signal PCL output from the controller 431.

A PPL 433 generates (in accordance with control data output from the controller 431) a first a PLL control signal for generating a frequency that is identical to a reception band frequency of the second RF receiver 392 in the main device 100, and a second PLL signal for generating a frequency that is identical to a transmission band frequency of the second RF transmitter 391 in the main device 100. A reception voltage controlled oscillator (RX_VCO) 435 generates a frequency being identical to the transmission band frequency of the second RF transmitter 391 in the main device 100 according to the output of the PLL 433, and a transmission voltage controlled oscillator (TX_VCO) 437 generates a frequency being identical to the reception band frequency of the second RF receiver 392 in the remote device 200 according to the output of the PLL 433. By utilizing the PLL 433, the RX_VCO 435 and the TX_VCO 437, the remote device 200 can set the channel frequency (via channel scanning) such that an optimal RF link to the main device 100 can be formed. As stated above, channel scanning techniques are well known in the art.

A reception amplifier 415 amplifies the transmission signal received from the main device 100 via the duplexer 413. A mixer 417 mixes an output of the reception amplifier 415 with a channel frequency output from the RX-VCO 435 to generate intermediate frequencies. An IF detector 419 selects a down-converted intermediate frequency from the intermediate frequencies output from the mixer 417. A demodulator 421 demodulates the intermediate frequency output from the IF detector 419. A reception audio amplifier 423 amplifies an audio signal output from the demodulator 421 and outputs it to a speaker 201. The demodulator 421 may include an ID detector for detecting ID data output from the main device 100. However, when the controller 431 is configured to detect the ID data, the demodulator 421 will not include the ID detector. In this embodiment, it is assumed that the demodulator 423 does not include the ID detector and the controller 431 detects the ID data by analyzing the output of the demodulator 421. It is to be understood that elements 415, 417, 419, 421, 433, and 435 constitute an RF receiver 491 of the remote device 200.

A transmission audio amplifier 425 amplifies a transmission audio signal output from a microphone 202. A modulator 427 modulates an amplified transmission audio signal output from the transmission audio amplifier 425 and up-converts the modulated signal to the transmission band frequency signal of the remote device 200 by using the channel frequency output from the TX_VCO 437. The modulator 427 may include an ID generator for generating ID data of the remote device 200. However, when the controller 431 is configured to generate the ID data to the modulator 427, the modulator 427 will not include the ID generator. In this embodiment, it is assumed that the modulator does not include the ID generator. A transmission amplifier 429 amplifies a signal output from the modulator 427 and outputs the amplified signal to the duplexer 413. It is to be understood that elements 427, 429, 431, 433 and 437 constitute an RF transmitter 429 for transmitting the radio transmission signal to the main device 100.

The operation of the cellular telephone according to a second embodiment of the present invention will now be discussed with reference to FIGS. 4A and 4B. In general, the main device 100 communicates with the cell site using the first radio circuit 380 and communicates with the remote device 200 through the second radio circuit 390. When the remote device 200 is set to an operation mode by the user, the power switch 449 is turned on to supply the reception power supply voltage Vrx to the RF receiver 491 of the remote device 200. For the convenience of explanation, it is assumed that the radio frequency communicated between the main device 100 and the cell site and the radio frequency communicated between the main device 100 and the remote device 200 are the same as those described above with respect to FIGS. 3A and 3B. Specifically, the TX_VCO 353 and the RX_VCO 355 in the main device 100 generate frequencies of 250 MHz and 359 MHz, respectively, and the RX_VCO 435 and the TX_VCO 437 in the remote device 200 generate frequencies of 230 MHz and 380 MHz, respectively.

Upon the receipt of call request data from the cell site, the first RF receiver 315 and the reception processor 314 provide the controller 111 with data informing receipt of the incoming call. The controller 311 then actuates the buzzer 303 and the display 302 to notify the receipt of the incoming call. Further, the controller 311 activates the first control signal CTL1 to activate the first switch 331 so as to connect the reception amplifier 314 to the modulator 333, thereby forming a radio link to the remote device 200. In addition, the controller 311 generates ID data of the main device 100 and call request data to notify the remote device 200 of receipt of the incoming call. The modulator 333 modulates the ID data and the call request data output from the controller 311 and up-converts the modulated data to the transmission band frequency according to the frequency output from the TX_VCO 353. Then, the transmission amplifier 335 amplifies the modulated signal and transmits it via the duplexer 337 and the antenna 339.

Similar to the embodiment of the cellular phone shown in FIGS. 3A and 3B, the cellular phone of the embodiment shown in FIGS. 4A and 4B utilizes a low-power radio wave such that the coverage (i.e., the maximum communicable distance between the main device 100 and the remote device 200) is approximately 3–5 m. As stated above, this improves the battery efficiency of the main device 100 and the remote device 200. Further, the cellular telephone uses radio frequencies which are not used by other radio communication systems.

Once the power switch 449 of the remote device 200 is turned on, the reception power supply voltage Vrx is supplied to the RF receiver 491 in the remote device 200. Then, the low-power radio signal received via the antenna 411 and the duplexer 413 is low-noise-amplified at the reception amplifier 415 and applied to the mixer 417. Here, the transmission signal received from the second RF transmitter 391 in the main device 100 has the frequency of 250 MHz and the frequency output from the RX_VCO 435 is 230 MHz. The mixer 417 mixes the outputs of the reception amplifier 415 and the RX_VCO 435 to generate intermediate frequencies which are equal to the sum and the difference of the two signals. The IF detector 419 selects the down-converted frequency of 20 MHz from the intermediate frequencies. Then, the demodulator 421 converts the intermediate frequency (i.e., 20 MHz) to 455 KHz, and demodulates the 455 KHz signal into the original data.

Then, the controller 431 analyzes the output of the demodulator 421 to determine whether call start data or call end data is received from the main device 100. If the demodulated data contains the ID data and the call request data from the main device 100, the controller 431 drives the display 445 and the buzzer 441 or the vibrator 443 to notify the receipt of the incoming call. Then, the controller 431 waits for the SEND key on the keypad 439 to be pressed. When the SEND key is pressed, the controller 431 activates the power control signal PCL to supply the transmission power supply voltage Vtx to the RF transmitter 492 (i.e., in response to the power control signal PCL, the switch 447 is activated to form a path for the transmission power supply voltage Vtx to the RF transmitter 492).

In addition, the controller 431 outputs the ID data of remote device 200 and the call answering data to the modulator 427. Then, the modulator 427 modulates the ID data and the call answering data and loads the modulated data into the 380 MHz frequency signal which is output from the TX_VCO 437. The transmission amplifier 429 power-amplifies the output of the modulator 427 and transmits the amplified signal via the duplexer 413 and the antenna 411.

The antenna 339 and the duplexer 337 in the main device 100 receive the transmission signal from the remote device 200 and apply it to the reception amplifier 341 which low-noise amplifies the received signal. Here, the signal transmitted from the remote device 200 has the frequency of 380 MHz. The mixer 343 mixes the received 380 MHz signal with the 360 MHz signal output from the RX_VCO 355, to generate signals equal to the sum and difference between the two signals. The IF detector 345 selects the 20 MHz intermediate frequency signal. The demodulator 347 converts the 20 MHz intermediate frequency signal to a 455 KHz signal and demodulates the converted signal.

The controller 311 analyzes the demodulated data output from the demodulator 347. If the demodulated data is determined to be the ID data and the call answering data from the remote device 200, the controller 311 activates the second control signal CTL2 to activate the second switch 349, thereby forming the signal path between the demodulator 347 and the transmission processor 321. In this manner, an RF link is formed between the second radio circuit 390 of the main device 100 and the remote device 200. Here, the remote device 200 continues to activate the switching control signal for the second switch 449, until the user ends the call. In the same manner as discussed above for the first embodiment, the main device 100 communicates with the remote device 200 using the low-power radio wave.

During the incoming call service, call end request can be issued from either the cell site or the remote device 200. For example, the user may issue the call end command by pressing the END key on the remote device 200. If the END key on the keypad 439 is pressed, the controller 431 generates the call end signal END, as well as ID data of the remote device 200 and call end data, which is provided to the modulator 427. The modulator 427 then modulates the ID data and the call end data and loads the modulated data into the channel frequency output from the TX_VCO 437 to up-convert it to the reception band frequency of the main device 100. The transmission amplifier 429 amplifies the output of the modulator 427 and transmits the amplified signal via the duplexer 413 and the antenna 411. Then, the second RF receiver 392 in the main device 100 receives the ID data and the call end data transmitted from the remote device 200. The controller 311 analyzes the output of the demodulator 347 to detect the call end data, and ends the call upon detection of the call end data.

On the other hand, if call end data is received from the cell site, the controller 311 detects it through the reception processor 314, and outputs the ID data of the main device 100 and the call end data to the modulator 333 in order to notify the remote device 200 of the call end state. The modulator 333 modulates the ID data and the call end data and transmits the modulated data. The RF receiver 491 in the remote device 200 then demodulates the transmission data received from the main device 100. The controller 431 cuts off the transmission power supply voltage Vtx to the RF transmitter 492 upon detection of the ID data of the main device 100 and the call end data output from the demodulator 421, thereby saving the battery. Further, upon detection of the call end data, the controller 311 in the main device 100 turns off the second switch 349 to cut off the signal path to the remote device 200.

In order to make an outgoing call using the remote device 200, the user will press a call attempt key on the keypad 439. Here, the call attempt key may be set by one or more function keys. If the call attempt key is pressed, the controller 431 activates the power control signal PCL to turn on the switch 447 so as to provide the RF transmitter 492 with the transmission power supply voltage Vtx. Further, the controller 431 outputs the ID data of the remote device 200 and the call attempt data to the modulator 427. Then, the RF transmitter 492 in the remote device 200 modulates and amplifies the ID data and the call attempt data and transmits them via the antenna 411. Then, the second RF receiver 392 in the main device 100 down-converts and demodulates the ID data and the call attempt data received from the remote device 200. The controller 311 analyzes the output of the demodulator 347 to detect the ID data and the call attempt data, and activates the first and second control signals CTL1 and CTL2 upon detection of the ID data and the call attempt data. In response to the first and second control signals CTL1 and CTL2, the first and second switches 331 and 349 are activated to form the signal path between the first RF receiver 315 and the second RF transmitter 391 and the signal path between the first RF transmitter 310 and the second RF receiver 392, respectively.

Next, when the user presses the dial keys and the SEND key using the keypad 439, the controller 431 outputs the received dial key data to the modulator 427. The dial key data is modulated and amplified and then transmitted via the antenna 411. The second RF receiver 392 in the main device 100 down-converts and demodulates the dial key data received through the antenna 339, and the controller 311 stores the dial key data received through the demodulator 347 in the memory therein. The controller 311 then outputs the stored dial key data to the transmission processor 321, which converts the dial key data to DTMF (Dual Tone Multi-Frequency) tone data. The first RF transmitter 310 converts the DTMF tone data to an RF signal which is transmitted via the antenna 312.

Once the call is answered, the controller 311 receives call answering data from the cell site via the first RF receiver 315 and the reception processor 314. Subsequently, the controller 311 outputs the call answering data to the second RF transmitter 391, which modulates and amplifies the call answering data and transmits it via the antenna 339. Then, the remote device 200 down-converts and demodulates the call answering data received through the antenna 411. When receiving the call answering data output from the demodulator 421, the controller 431 senses that the other party has answered the outgoing call. Subsequently, the outgoing call originated from the remote device 200 is serviced in the same manner as described above.

The user can also make an outgoing call using the main device 100. In this case, the controller 311 turns off the first and second switches 331 and 349 to cut off the signal paths to the remote device 200. Then, the user can talk over the telephone using the speaker 305 and the microphone 306 connected to the audio circuit 304 in the main device 100.

As described above, the cellular telephone of the invention can be separated into the main device and the remote device, which wirelessly communicate with each other. Advantageously, the user can put the main device in the handbag and the remote device in the pocket, which contributes to the convenience of the user in making or answering a call.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A cellular telephone, comprising:
   a main device having a first radio circuit for communicating with a cell site, a second radio circuit, a first switch and a second switch; and
   a remote device having a third radio circuit for communicating with said second radio circuit of said main device, wherein upon receipt of an incoming call from said cell cite, said main device transmits call receipt information to said remote device and said remote device processes said incoming call through said main device;
   wherein said first switch and said second switch operate automatically under the control of the main device to block signal paths formed between the main device and the remote device when a call is placed using the main device.

2. The cellular telephone of claim 1, wherein said main device and said remote device are detachably coupled to each other.

3. The cellular telephone of claim 1, wherein said first radio circuit of said main device includes a first radio frequency (RF) receiver for receiving and processing RF signals transmitted from said cell site and a first RF transmitter for generating RF signals sent to said cell site, and wherein said second radio circuit of said main device includes a second RF receiver for receiving and processing RF signals transmitted from said third radio circuit of said remote device and a second RF transmitter for transmitting RF signals to said third radio circuit of said remote device.

4. The cellular telephone of claim 3, wherein said main device further includes a signal processor having a reception processor for processing signals received from said first RF receiver and a transmission processor for processing signals transmitted to said first RF transmitter, and a controller for controlling the operation of said first radio circuit, said reception processor, said transmission processor, said second RF receiver and said second RF transmitter, and wherein said third radio circuit includes a third RF receiver for receiving and processing RF signals transmitted from said second RF transmitter of said main device, and a third RF transmitter for processing transmission signals sent to said second RF receiver of said main device, whereby said controller controls the formation of a first radio link between said first RF receiver and said second RF transmitter, and controls the formation of a second radio link between said first RF transmitter and said second RF receiver.

5. The cellular telephone of claim 4, wherein said controller analyzes an output of said reception processor, generates a call control signal upon receiving call receipt information, forms said first radio link between said first RF receiver and the second RF transmitter and said second radio link between said first RF transmitter and said second RF receiver upon receipt of call answering data from said remote device, and generates a call end control signal and terminates said first and second radio links upon receipt of call end information.

6. The cellular telephone of claim 4, wherein:
   the first switch is operatively connected between said reception processor and said second RF transmitter for coupling said reception processor to said second RF transmitter to form said first radio link under the control of said controller; and
   the second switch is operatively connected between said transmission processor and said second RF receiver for coupling said transmission processor to said second RF receiver to form said second ratio link under the control of said controller.

7. The cellular telephone of claim 6, wherein said first switch is activated by a first call control signal, said first call control signal being generated by said controller in response to call receipt information received by said controller, wherein said second switch is activated by a second call control signal, said second call control signal being generated by said controller in response to call answering data received by said controller, and wherein said controller deactivates said first and second switch in response to call end information to terminate said first and second radio links.

8. The cellular telephone of claim 5, wherein said second RF transmitter generates call request data upon detection of said call control signal, and modulates and up-converts an audio signal output from the reception processor and said call request data to a first radio signal, and wherein said second RF receiver, operatively connected to said transmission processor, down-converts and demodulates a second radio signal received from said remote device and outputs said demodulated second radio signal to said transmission processor.

9. The cellular telephone of claim 8, wherein said remote device includes:
   a third RF receiver for down-converting and demodulating said first radio signal from said main device to extract said call request data and said audio signal of said first radio signal;
   a speaker for outputting said demodulated audio signal;
   a discriminator, operatively connected to said third RF receiver, for analyzing said demodulated call request data output from said third RF receiver, displaying a call receipt state, generating a transmission power control signal upon detection of said call request data, outputting a call answering signal to generated said call answering data, and generating call end data in response to a call end signal; and
   a third RF transmitter for up-converting and modulating said call answering data, said call end data, said audio signal output from a microphone and transmitting said modulated data to said main device.

10. The cellular telephone of claim 9, further comprising:
   a power supply having a power switch for providing reception power supply voltage to said third RF receiver in response to said transmission power control signal, said power switch being activated to provide a transmission power supply voltage to said third RF transmitter when said call is answered, said power switch being deactivated to cut off the transmission power supply voltage to said third RF transmitter when said call is ended.

11. A cellular telephone comprising:
   a main device including:
      a first radio circuit for communicating with a cell site, said first radio circuit having a first RF receiver for receiving and processing signals transmitted from said cell site and a first RF transmitter for processing and transmitting encoded transmission data to said cell site;
      a reception processor for decoding said processed signals from said first RF receiver;
      a second RF transmitter, operatively connected to said reception processor, for modulating an audio signal output from said reception processor to a first radio signal;
      a second RF receiver for demodulating a second radio signal;
      a transmission processor, operatively connected to said second RF receiver, for providing encoded transmission data to said first RF transmitter; and a first controller, for selectively coupling said first RF receiver to said second RF transmitter to form a first radio link and for selectively coupling said second RF receiver to said first RF transmitter to form a second radio link; and a remote device including:
   a third RF receiver for receiving and processing said first radio signal, said first radio signal being transmitted from said second RF transmitter when said first radio link is formed under control of said first controller;
   a third RF transmitter for generating said second radio signal, said second radio signal including audio signals generated from said remote device, and transmitting said second radio signal when said second radio link is formed under control of said first controller;
   a first switch, operatively connected between said reception processor and said second RF transmitter, for coupling said reception processor to said second RF transmitter to form said first radio link under the control of said controller; and
   a second switch, operatively connected between said transmission processor and said second RF receiver, for coupling said transmission processor to said second RF receiver to form said second radio link under the control of said controller.

12. The cellular telephone of claim 11, wherein said first controller further analyzes said decoded data output from said reception processor, generates a first call control signal in response to one of call receipt information and call originating information to form said first radio link between said first RF receiver and said second RF transmitter, generates a second call control signal to form said second radio link between said first RF transmitter and said second RF receiver upon receipt of call answering data, and deactivates said first and second call control signals to cut-off said radio links upon receipt of call end information, and wherein said second RF transmitter generates call request data upon receipt of said first call control signal and generates call answering data upon receipt of call attempt data.

13. The cellular telephone of claim 12, wherein a second controller analyzes said demodulate data output from said third RF receiver, displays a call receipt state, generates a transmission power control signal upon detection of said call request data, outputs said call answering data when the call is answered, generates said transmission power control signal and said call attempt data when the call is attempted, and generates call end data when the call is ended, and wherein said third RF transmitter modulates said call answering data, said call attempt data and said call end data from said controller, said modulated data being included in said second radio signal.

14. The cellular telephone of claim 13, wherein said remote device further comprises a power supply having a power switch, for providing a reception power supply voltage to said third RF receiver, wherein when the call is one of answered and attempted, said power switch is activated to provide a transmission power supply voltage to said third RF transmitter, and wherein when the call is ended, said power switch deactivated to cut off said transmission power supply voltage to said third RF transmitter.

15. A method for operating a cellular telephone having a main device for providing radio communication with a cell site and a remote device for communication with said cell cite through said main device, said method comprising the steps of:

servicing an incoming call, said step of servicing an incoming call comprising the substeps of:
   transmitting call information from said main device to said remote device upon receipt of an incoming call by said main device from said cell cite; and
   displaying a call receipt state and processing said incoming call by said remote device upon receipt of said call information from said main device; and servicing an outgoing call, said step of servicing an outgoing call comprising the substeps of:
   transmitting call attempt information from said remote device to said main device when originating an outgoing call from said remote device; and
   transmitting call answering information from said main device to said remote device so as to process an outgoing call from said remote device to said cell cite by communication through said main device;

wherein said main device includes switching means operable to automatically block signal paths formed between the main device and the remote device when a call is placed using the main device.

16. The method of claim 15, wherein said main device includes a first radio circuit for communicating with said cell cite and a second radio circuit for communicating with said remote device, said remote device having a third radio circuit for communicating with said second radio circuit, and wherein the substep of transmitting said call information for the step of servicing an incoming call, further includes the substeps of:
   forming a first radio link between said first radio circuit of said main device and said cell cite;
   forming a second radio link between said second radio circuit of said main device and said third radio circuit of said remote device;
   transmitting call request data from said main device to said remote device through said second radio link;
   transmitting call answering data from said remote device to said main device through said second radio link in response to said transmitted call request data; and
   processing the incoming call between said main device and said remote device through said second radio link and said main device and said cell site through the first radio link.

17. The method of claim 16, further including the substep of terminating said first and second radio links in response to call end data and placing said cellular telephone in a call wait state.

18. The method of claim 16, wherein the step of servicing an outgoing call, further comprises the substeps of;
   forming a first radio link between said second radio circuit of said main device and said third radio circuit of said remote device in response to said call request data transmitted to said main device from said remote device;
   forming a second radio link between said main device and said cell cite;
   transmitting call answering data from said cell cite to said remote device through said main device in response to said call request data; and
   processing the outgoing call via the first and second links.

19. The method of claim 18, further including the substep of terminating said first and second radio links upon detection of the call end data.

* * * * *

UNITED STATES PATENT AND TRADEMARK OFFICE
CERTIFICATE OF CORRECTION

PATENT NO. : 6,216,017 B1
DATED : April 10, 2001
INVENTOR(S) : Lee et al.

It is certified that error appears in the above-identified patent and that said Letters Patent is hereby corrected as shown below:

Column 18,
Line 67, delete "and".

Column 19,
Line 5, delete "and".
Between lines 5 and 6, insert:
-- a first switch, operatively connected between said reception processor and said second RF transmitter, for coupling said reception processor to said second RF transmitter to form said first radio link under the control of said controller; and a second switch, operatively connected between said transmission processor and said second RF receiver, for coupling said transmission processor to said second RF receiver to form said second radio link under the control of said controller; and --.
Line 11, insert -- and -- after "controller;".
Line 17, delete ";
a first switch, operatively connected between said reception processor and said second RF transmitter, for coupling said reception processor to said second RF transmitter to form said first radio link under the control of said controller; and a second switch, operatively connected between said transmission processor and said second RF receiver, for coupling said transmission processor to said second RF receiver to form said second radio link under the control of said controller".

Signed and Sealed this

Second Day of May, 2006

JON W. DUDAS
*Director of the United States Patent and Trademark Office*